United States Patent Office 3,343,991
Patented Sept. 26, 1967

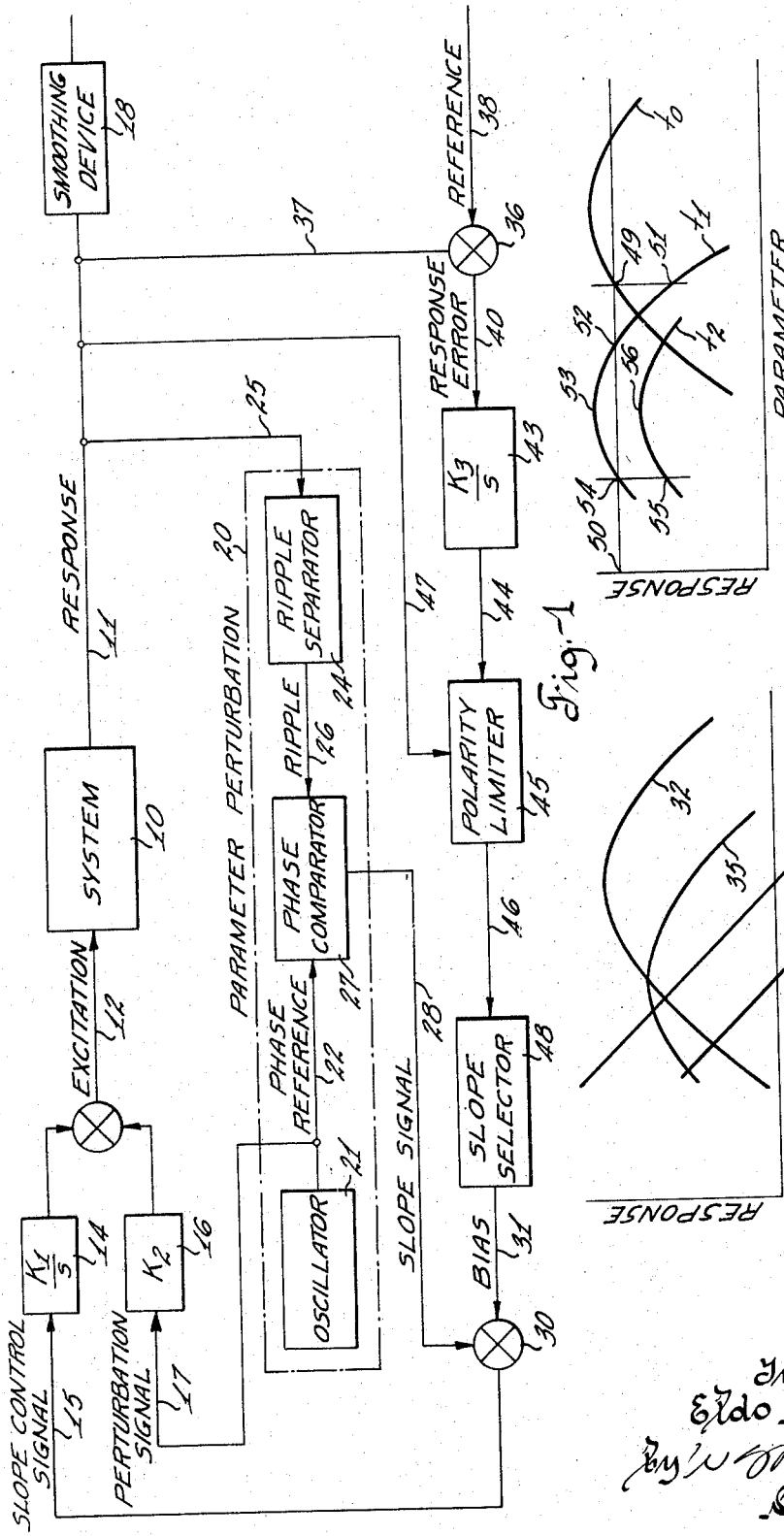

3,343,991
CONTROL FOR A SYSTEM WITH A PARABOLIC RELATIONSHIP BETWEEN A PARAMETER AND AN OUTPUT
Eldo C. Koenig, Madison, Wis., assignor to Allis-Chalmers Manufacturing Company, Milwaukee, Wis.
Continuation of application Ser. No. 208,875, July 10, 1962. This application Feb. 16, 1966, Ser. No. 534,620
4 Claims. (Cl. 136—86)

This application is a continuation of my co-pending application Ser. No. 208,875, filed July 10, 1962, now abandoned, entitled "Control for a System With a Parabolic Relationship Between a Parameter and an Output."

This invention relates to a control for a system. More specifically, this invention relates to a control that regulates a system through a range where the response of the system ambiguously indicates two different conditions of a controlling parameter and thus indicates two different corrective changes that the control should make in the parameter.

A fuel cell is an example of an application for this control. The voltage of certain types of fuel cells is a function of the moisture of the fuel cell. Moisture is removed as the cell operates, and the quantity of moisture in the cell at any time is the integral of the difference between the rate that the fuel cell produces moisture and the rate that the moisture is removed. Thus, opening or closing a moisture exhaust valve correspondingly increases or decreases the moisture (assuming the production rate is constant), and the valve setting influences the voltage of the cell. At an optimum value of moisture the cell produces maximum voltage, and either increasing or decreasing the moisture from this optimum value decreases the voltage. A typical curve relating the voltage and moisture of a fuel cell is shown in FIG. 2. The curve is generally parabolic, and on opposite sides of the optimum value there are pairs of values of the controlling parameter (moisture) that produce the same response.

Considering the operation of a control for a system with a single polarity curve relating its output to its input will help to explain the problems of controlling the fuel cell. Such a control compares the system response with a reference and then increases or decreases a controlling parameter to adjust the response to a value represented by the reference. The polarity of the curve establishes the relationship between the direction that the parameter changes and the direction of the resulting change in the response. Because the slope of the curve of FIG. 2 is positive on one side of the optimum and negative on the other, similar changes in values of the parameter that correspond to the same response produce opposite direction changes in the response. Ordinarily the value of the parameter does not by itself indicate reliably whether the system is operating on the positive slope or the negative slope because the curve of the system changes as the operating conditions vary and as the components of the system age. Thus, to adjust the parameter correctly, a control for the system must distinguish between corresponding parameter values that produce the same response.

A technique called parameter perturbation can be applied in controls to distinguish the response at the operating point of the system from the identical response on the opposite slope of the curve. A parameter perturbation control varies the controlling parameter to operate the system at the only unique point, the peak of the curve where the response is an optimum.

It may be desirable to maintain a particular response without regard to whether this is the optimum. For example, varying the moisture of the fuel cell properly would regulate the voltage of the cell to a desired value. A perturbation control responds to the slope of the curve rather than to the value of the response, and therefore it provides only one step toward regulating the response of a system through a range where the response indicates the parameter ambiguously.

The well developed art of controls for systems with an unambiguous response does not solve the problems of a system with a parabolic curve even aside from the ambiguity. With a parabolic curve the system may not have sufficient range for the desired response. A conventional control would continue to call for some corrective action even when the system was producing the best possible response.

The control of this invention uses parameter perturbation techniques to produce a signal that indicates the polarity and the magnitude of the slope of the curve at the operating point of the system. The control combines a bias signal with the slope indicating signal and thereby tends to move the operating point of the system to any selected slope of the curve. The control compares the response of the system with the desired response and it varies the bias signal so that the control seeks the slope of the curve where the system has the desired response.

One advantage of the control is that even though it seeks the desired response indirectly in terms of the slope of the curve the control distinguishes between operating points that have the same slope and it seeks the slope where the system produces the desired response.

Another advantage of the control is that it regulates the system at its optimum response if the desired response is outside the range of the system.

One object of this invention is to provide a new and improved parameter perturbation control.

Another object of this invention is to provide a new and improved control for a system that has pairs of corresponding values of a controlling parameter that produce the same response.

Another object of this invention is to provide a new and improved control that operates a system on a selected slope of its curve.

Another object of this invention is to provide a new and improved control for a system that may not have sufficient range to provide the desired response.

The drawing and the detailed description of the control will suggest other objects and advantages of this invention.

In the drawing,

FIG. 1 shows in block diagram form the control of this invention and a system that uses this control.

FIG. 2 shows the curve of the system of FIG. 1 and related curves that the control develops.

FIG. 3 shows the curve of the system at three different times.

*The controlled system*

FIG. 1 shows a system 10, such as a fuel cell, that uses the control of this invention. As FIG. 2 shows, the system 10 has a generally parabolic curve that relates its response 11 to a controlling parameter. A primary control device 14 receives a control signal 15 (described later) and varies an excitation 12 that controls the parameter. The legend $K_1/s$ that is written in the box 14 is the transfer function of control device 14. This transfer function indicates that the primary control device changes the excitation 12 (and thereby the operating point of the system) steadily so long as the signal 15 is not zero, and it moves the operating point of the system along the curve of FIG. 2 to the right or the left, depending on the polarity of signal 15. As will be explained, the system responds to signal 15 in a way that tends to reduce the magnitude of signal 15 to zero. When control signal 15 is zero, primary control device 14 holds its position. A secondary control device 16 with the transfer function $K_2$ receives an oscillatory signal 17 (described later), and it perturbs the excitation about the effective value that the primary control device 14 establishes. This perturbation produces a ripple in the response 11, and a smoothing device 18 may be used to reduce this ripple.

In the example of the fuel cell the parameter is moisture and the response 11 is voltage. Primary control device 14 may include a relatively large valve in the moisture control system and a reversible electrical motor that drives the valve in response to signal 15. Secondary control device 16 may be a smaller valve connected in parallel with the larger valve. Excitation 12 is the flow of moisture from the fuel cell through the two valves. Smoothing device 18 may comprise a low pass filter. The control may be used with systems that have various parameter control devices.

The parameter perturbation section

The control has a parameter perturbation section 20 that is enclosed in dot-dash lines in FIG. 1. The parameter perturbation section 20 includes an oscillator 21 that produces a perturbation signal 17 and produces a phase reference 22 of perturbation signal 17. As signal 17 perturbs the excitation 12, a ripple appears in the response 11. If the system is operating on the positive slope of its transfer function, the ripple is in phase with the perturbation. That is, an increase in excitation 12 raises response 11, and a decrease in excitation 12 lowers response 11. When the system is operating on the negative slope of the curve, the ripple is about 180° out of phase with the perturbation. Thus, the phase of the ripple with respect to the perturbation indicates the polarity of the slope at the operating point.

Perurbation signal 17 preferably has a constant amplitude and thus is a tacit reference for the amplitude of the ripple. Therefore, the amplitude of the ripple is a function of the slope of the curve in the neighborhood of the operating point.

The perturbation is made rather slow, for example one cycle per minute, to cause the ripple to be readily distinguishable from other frequencies in the response 11 as well as from the effective value of the response. A ripple separator 24 receives a signal 25 which is a measure of the response 11, and it produces a ripple signal 26 that indicates the response of the system to only the perturbation. In the example of a fuel cell where the response signal 25 is a voltage, a frequency sensitive electrical network that passes only the ripple frequency is a suitable ripple separator.

A phase comparator 27 receives ripple signal 26 and phase reference signal 22, and it combines these signals 22, 26 to form a slope signal 28. The polarity of slope signal 28 corresponds to the polarity of the slope of the curve at the operating point, and the magnitude of slope signal 28 corresponds to the magnitude of the slope at the operating point. A suitable phase comparator for electrical quantities which represent signals 22, 26 is a device that electrically multiplies the phase reference signal 22 and the ripple signal 26.

The biasing section

An adder 30 combines slope signal 28 with a bias signal 31 and produces slope control signal 15 that controls system 10 through primary control device 14 to produce the desired response. Slope signal 28 considered alone tends to move the operating point of the system to the optimum parameter value where the slope of the curve is zero. Bias signal 31 considered alone operates the primary control device 14 to move the operating point of the system to the extreme right or the extreme left of the curve depending on the polarity of the bias signal. The combined signal 15 tends to regulate the system at the operating point where slope signal 28 and bias signal 31 are equal in magnitude and opposite in polarity.

FIG. 2 shows the curve 32 of system 10 and the derivative 33 of the curve. Slope signal 28 is identical to derivative 33 at the zero crossing and it is preferably closely related (but not necessarily identical) to the derivative elsewhere. Bias signal 31 moves derivative 33 to the right or to the left, depending on the polarity of the bias signal, to produce an apparent derivative 34. Corresponding to apparent derivative 34 is an apparent system curve 35 that has an optimum response where apparent derivative 34 is zero (slope signal 28 is equal and opposite to bias signal 31) and has the value of curve 32 at this point. Considered as an optimizing control, the control of this invention seeks the optimum value of the parameter on apparent system curve 35.

In effect, bias signal 31 adds to response 11 on one side of the operating point and subtracts from the response on the other side of the operating point. Thus, bias signal 31 may be combined with slope signal 28 as the drawing shows or it can operate at any other appropriate point to increase one portion of ripple signal 25 in relation to another portion.

The error signal section

The control varies bias signal 31 and apparent system curve 35 of the system 10 to operate the system where the slope of curve 32 corresponds to the desired response and the slope of apparent system curve 35 is zero. An adder 36 combines a signal 37 that is a measure of response 11 with a reference signal 38 that indicates the desired response, and it produces a response error signal 40.

Error signal 40 varies in magnitude according to the difference between response signal 37 and reference signal 38, and it varies in polarity to indicate whether response 11 is higher or lower than the desired response. Suitable error sensing devices are well known for systems with unambiguous system curves in which the polarity of the error signal directly indicates whether the control should increase or decrease the parameter.

The polarity of error signal 40 indicates whether response 11 is above or below the desired response. In other words, the polarity of error signal 40 indicates whether the control should move the operating point up or down the slope of the curve. As has been explained, increasing the magnitude of bias signal 31 (regardless of the polarity) moves the operating point down the slope of the corresponding polarity, and reducing the bias magnitude moves the operating point up the slope. The magnitude of error signal 40 indicates generally the change in the magnitude of bias signal 31 that will correct the response, and the magnitude of error signal 40 is substantially zero when the bias signal has the proper magnitude.

A component 43 receives error signal 40 and produces a signal 44 that is related to bias signal 31. The signal 44 can be considered to correspond in magnitude to bias signal 31 when the system 10 has the selected response, or the relation of bias signal 31 and signal 44 can be considered from a different standpoint that will be described later. Component 43 increases the magnitude of signal 44 when the response 11 is higher than the desired response, and it decreases the magnitude of signal 44 when response 11 is lower than the desired response. The polarity of error signal 40 indicates whether response 11 is higher or lower than the desired response. Thus, component 43 converts the polarity form of error signal 40 to a magnitude form in signal 44. Preferably the rate that component 43 increases and decreases the magnitude of signal 44 is related to the magnitude of error signal 40. The transfer function of component 43, $K_3/s$, provides this relation.

As the transfer function of component 43 indicates, component 43 might change the polarity as well as the magnitude of signal 44 in response to the polarity of response error signal 40. A polarity change in signal 44 would indicate that bias signal 31 had not been reduced sufficiently to correct the error in response 11. In changing the polarity of signal 44 (and bias signal 31), component 43 would be attempting to move the operating point farther up the slope when in fact the control would produce the optimum value of response 11 when the magnitudes of signal 44 and bias signal 31 are zero. It is desirable to limit the polarity of error signal 31 since changing the polarity would operate the control device 14 but would not improve response 11. A polarity limiter 45 receives the magnitude varying, polarity variable, signal 44 and produces a polarity invariant signal 46. The primary control device 14 responds to the polarity of signal 46 to move the operating point of the system along only a selected polarity slope of the curve.

A reversible motor is a suitable device for component 43 and a potentiometer that is driven by the motor is suitable for component 45. The motor is connected to receive error signal 40 and to raise or lower a variable tap on the potentiometer according to the polarity of signal 40. Fixed taps of the potentiometer are connected to a suitable potential source, and signal 46 appears between the movable tap and one fixed tap. In this example of components 43 and 45, the angular position of the motor shaft with respect to a reference position represents the magnitude of signal 44 and the direction that the motor has rotated from the reference represents the polarity of signal 44. The potentiometer produces a polarity invariant electrical signal 46 that varies in magnitude with the angular position of the motor (the magnitude of signal 44). The potentiometer is electrically connected so that at one extreme position the signal 46 is zero, and limit switches on the motor prevent the motor from driving the variable tap past the fixed taps in either extreme position.

The magnitude of signal 46 and the position of the movable tap of the potentiometer correspond approximately to the slope of curve 32. Thus the potentiometer may be made nonlinear to produce a selected relationship between the slope of curve 32 and the rate of change of signal 46 in response to error signal 40. For example, the potentiometer might be made nonlinear to slow the response of the control as the variable tap of the potentiometer nears the zero output position and system 10 nears its optimum response.

The potentiometer may be electrically energized across its fixed taps by a signal 47 that is a measure of response 11. The explanation of this feature provides a somewhat different insight to the invention. So long as transfer function 32 and signal 44 remain constant, bias signal 31 is a fixed proportion of response signal 47. The control device 14 responds to bias signal 31 to oppose changes in signals 31 and 47 and response 11 (so long as the polarity of the slope of curve 32 corresponds to the polarity of bias signal 31). Thus bias signal 31 would regulate the system for some particular value of response 11. This value would depend on the relationship between the values of bias signal 31, slope signal 28, and response signal 47. Thus, component 43 can be thought of as adjusting the relationship between bias signal 31 and response signal 47 whenever required to maintain a selected response and to compensate for changes in curve 32.

A slope selector 48, which may comprise a double throw, double pole switch or the semiconductor equivalent of such a switch, receives polarity invariant signal 46 and produces bias signal 31. Slope selector 48 is operated to reverse the polarity of signal 46 whenever it is desired to operate on the opposite slope of the curve. Slope selector 48 may also comprise the conductors connecting polarity limiter 45 and adder 30 since transposing the conductors will change the polarity of bias signal 31 with respect to signal 46. Thus, polarity invariant signal 46 may be considered to be equivalent to bias signal 31.

FIG. 3 illustrates the operation of the control to maintain a desired response as the curve varies at sucessive times $t_0$, $t_1$, and $t_2$. At time $t_0$ the system is operating on the positive slope of the curve at the proper point 49 for the desired response 50. Response error signal 40 is zero, and bias signal 31 has a value that is determined by the position of component 45 and is equal in magnitude and opposite in polarity to slope signal 28. Slope control signal 15 is zero and primary control device 14 maintains some appropriate fixed value of excitation 12.

With the change in the curve at time $t_1$, the system begins operating at a point 51 where the response 11 is below the desired response and the parameter is either above or below the required value. The exact relation between the existing parameter value and the desired parameter value depends on the polarity of the slope of the curve at point 51 as well as on the direction of the response error. In the example of FIG. 3, operating point 51 is on the negative slope of the curve and the parameter is higher than the desired value. The polarity of response error signal 40 indicates that response 11 is low, and component 43 begins steadily decreasing the magnitude of bias signal 31. Control device 14 decreases excitation 12 in response to the decrease of bias signal 31 and tends to move the operating point of system 10 to the left in FIG. 3. Slope signal 28 also has the proper polarity to move the operating point up the slope and to the left. At operating point 52, response 11 has the proper value but the slope has the undesired negative polarity. Although error signal 40 is zero at point 52 and bias signal 31 may have been reduced to zero by component 43, slope signal 28 continues to move the operating point to the left. (Operating the slope selector 48 when the polarity of the slope signal 28 changes would hold the system at operating point 52.) As the operating point continues to the left past point 52 of desired response, but undesired polarity, error signal 40 changes polarity to begin increasing the magnitude of bias signal 31. Error signal 40 also increases in magnitude at the point of optimum response 53, slope signal 28 is zero, and as the operating point moves to the left of optimum response point 53, slope signal 28 increases in magnitude and has the proper polarity to oppose further change to the left in the operating point of the system. At point 54 response 11 has the desired value, response error signal 40 is zero, component 43 holds bias signal 31 at a value that is equal to slope signal 28, and control device 14 provides the proper excitation 12.

From the example of the operation of the control after time $t_1$, it should be apparent that the control will regulate the system for the desired response even if the value of the slope that corresponds to the desired response is not unique or if the magnitude of the corresponding slope signal 28 is not unique.

At time $t_2$, the system begins operating at a point 55 where the parameter and the response are both low. The curve at time $t_2$ does not provide sufficient range for the desired response. Consequently, error signal 40 will not become zero. Beginning at time $t_2$ component 43 runs component 45 to its limit and thereby reduces bias signal 31 to zero. With bias signal 31 reduced to zero the parameter perturbation section 20 alone controls device 14 to maintain the optimum response at point 56.

From the explanation of the invention in connection with a system having a maximum response, it should be apparent that the control of this invention is also suitable for a system in which the zero slope of the curve occurs at a minimum response.

Although the invention has been described with specific references to a fuel cell, the response 11 of the system is not necessarily an output as is the voltage of a fuel cell. Response 11 may be any controllable and measurable characteristic of the system.

In the example of the fuel cell, the control varies the parameter, moisture, indirectly by varying the valve 14 and the moisture flow 12. For many systems, response 11 is directly related to a physically controllable device such as a valve, and the term "parameter" as it has been used in this description and in the drawing would apply to such a control device or to its output.

The description of the invention will suggest many systems that might use the control, and those skilled in the art will find various modifications of the control that are within the scope of the invention.

The embodiments of the invention in which an exclusive property or privilege is claimed are defined as follows.

What is claimed is:
1. In combination,
 (a) a system having an output signal whose value is related to the value of a variable quantity in said system in such a way that any change in the value of said quantity effects a change in the value of said output signal,
 (b) a control device operable to change the value of said quantity, and
 (c) a control for operating said control device and comprising,
  (i) perturbation means comprising an oscillator for producing a perturbation signal which operates said control device to provide a ripple signal in the output signal,
   said perturbation means further comprising a phase comparator means for comparing the phase of said perturbation signal and said ripple signal,
   said perturbation means providing a slope signal which indicates whether a change in value of said quantity is an increase or decrease,
  (ii) means responsive to said output signal to provide a response signal,
  (iii) means responsive to said output signal to provide an error signal when said output signal differs from a perturbation value,
  (iv) means responsive to said response signal and to said error signal to provide a bias signal, and
  (v) means responsive to said slope signal and said bias signal to produce a slope control signal which operates said control device to change the value of said quantity to effect an increase in the value of said output signal.

2. The combination according to claim 1 wherein said error signal varies in polarity to indicate whether said output signal is above or below said predetermined value and wherein said bias signal is polarity invariant and increases in magnitude when said error signal has one polarity and decreases in magnitude when said error signal has the opposite polarity.

3. In combination,
 (a) a fuel cell having an output voltage which is related to the amount of moisture in said cell in such a way that a change in said amount of moisture effects a change in said voltage,
 (b) a control device comprising first and second valves operable to change the amount of moisture in said cell, and
 (c) a control for operating said control device and comprising,
  (i) perturbation means comprising an oscillator which effects operation of said second valve thereby producing a perturbation signal providing a ripple signal in said output voltage,
   said perturbation means further comprising a phase comparator means for comparing the phase of said perturbation signal and said ripple signal,
   said perturbation means providing a slope signal which indicates whether a change in the amount of moisture is an increase or decrease,
  (ii) means responsive to said output voltage to provide a response signal,
  (iii) means responsive to said output voltage to provide an error signal when said voltage is below a predetermined value,
  (iv) means responsive to said response signal and to said error signal to provide a bias signal, and
  (v) means responsive to said slope signal and said bias signal to produce a slope control signal which effects operation of said first valve to change the amount of moisture in such a way as to effect an increase in said output voltage.

4. The combination according to claim 3 wherein said error signal varies in polarity to indicate whether said output signal is above or below said predetermined value and wherein said bias signal is polarity invariant and increases in magnitude when said error signal has one polarity and decreases in magnitude when said error signal has the opposite polarity.

References Cited

UNITED STATES PATENTS

| | | | |
|---|---|---|---|
| 2,666,584 | 1/1954 | Kliever | 236—15 |
| 2,842,108 | 7/1958 | Sanders | 123—102 |
| 3,105,928 | 10/1963 | Congleton et al. | 318—28 |
| 3,109,970 | 11/1963 | Smyth | 318—28 |
| 3,149,270 | 9/1964 | Smyth et al. | 318—28 |

JOHN F. COUCH, *Primary Examiner.*

W. E. RAY, *Assistant Examiner.*